US011178278B2

(12) United States Patent
Rana, III

(10) Patent No.: US 11,178,278 B2
(45) Date of Patent: Nov. 16, 2021

(54) MULTI-MEDIA COMMUNICATION SYSTEM FOR INCARCERATED PERSONS

(71) Applicant: TextBehind, Inc., Phoenix, MD (US)

(72) Inventor: Zia Rana, III, Owings Mills, MD (US)

(73) Assignee: TEXTBEHIND, INC., Phoenix, MD (US)

( * ) Notice: Subject to any disclaimer, the term of this patent is extended or adjusted under 35 U.S.C. 154(b) by 12 days.

(21) Appl. No.: 16/929,870

(22) Filed: Jul. 15, 2020

(65) Prior Publication Data
US 2021/0021705 A1 Jan. 21, 2021

Related U.S. Application Data

(60) Provisional application No. 62/874,202, filed on Jul. 15, 2019.

(51) Int. Cl.
H04M 3/42 (2006.01)
G06F 16/21 (2019.01)
G06F 16/215 (2019.01)

(52) U.S. Cl.
CPC ...... H04M 3/42357 (2013.01); G06F 16/215 (2019.01); G06F 16/219 (2019.01);
(Continued)

(58) Field of Classification Search
CPC ............. H04W 36/36; H04W 72/1242; H04W 72/1284; H04W 36/305; H04W 72/1268;
(Continued)

(56) References Cited

U.S. PATENT DOCUMENTS 7,529,357 B1 * 5/2009 Rae .......... H04M 3/38 370/261
7,899,167 B1 * 3/2011 Rae .......... H04M 7/006 379/189

(Continued)

OTHER PUBLICATIONS

Chang, Jou-Chih, et al. "iMace: protecting females from sexual and violent offenders in a community via smartphones." 2011 40th International Conference on Parallel Processing Workshops. IEEE, 2011. (Year: 2011).*

(Continued)

Primary Examiner — Sharad Rampuria
(74) Attorney, Agent, or Firm — Royal W. Craig; Gordon Feinblatt LLC

(57) ABSTRACT

A system, method and computer program product for managing cross-platform communications between families and friends with incarcerated loved ones securely, conveniently and affordably, and with full audit trail for accountability. The system includes a plurality of computers or portable devices used by each party including family and friends, their incarcerated inmate, a correctional facility, facility staff and/or inmates, and a facilitating Application Service provider (ASP) providing Software as a Service (SaaS). The ASP provides a dashboard to each party including a family/friends dashboard, an administrative dashboard that facilitates initial ASP processing, a scanning dashboard that facilitates remote screening, a correctional staff dashboard that facilitates pre-screening and delivery, and an inmate dashboard that facilitates receipt and reply. The various participant dashboards update a transaction record and provide a collaboration platform by which the ASP can automate key facets of the process, the correctional facility staff and/or inmates can fulfill their duties, and families, friends and incarcerated loved ones can communicate more quickly, efficiently and inexpensively.

24 Claims, 8 Drawing Sheets

(52) U.S. Cl.
CPC ....... *H04M 3/4217* (2013.01); *H04M 3/4228* (2013.01); *H04M 3/42238* (2013.01)

(58) Field of Classification Search
CPC . H04W 74/0833; H04W 36/06; H04W 16/28; H04W 76/19; H04B 7/0695
See application file for complete search history.

(56) References Cited

U.S. PATENT DOCUMENTS

| | | | |
|---|---|---|---|
| 8,750,486 B1 * | 6/2014 | Keiser | H04M 3/51 379/265.01 |
| 9,311,627 B1 | 4/2016 | Shipman, Jr. | |
| 2016/0337360 A1 † | 11/2016 | Logan | |

OTHER PUBLICATIONS

Shanahan and Agudelo, "The Family and Recidivism", American Jails, p. 17 (Sep./Oct. 2012).

Marko Zivkovic, How to import/export data to SQL Server using the SQL Server Import and Export Wizard, pp. 1-13, Oct. 27, 2017, SQLShack, https://www.sqlshack.com/importexport-data-sql-server-using-sql-server-import-export-wizard/.†

Chris Saxon, How to Find and Delete Duplicate Rows with SQL, pp. 1-17, Jan. 29, 2016, Oracle, https://blogs.oracle.com/sql/how-to-find-and-delete-duplicate-rows-with-sql.†

Prashanth Jayaram, Overview of the SQL Insert statement, pp. 1-10, Oct. 16, 2018, SQLShack, https://www.sqlshack.com/overview-of-the-sql-insert-statement.†

\* cited by examiner
† cited by third party

BEFORE (Default Tone)  AFTER (Items in Gray Scale Tone)
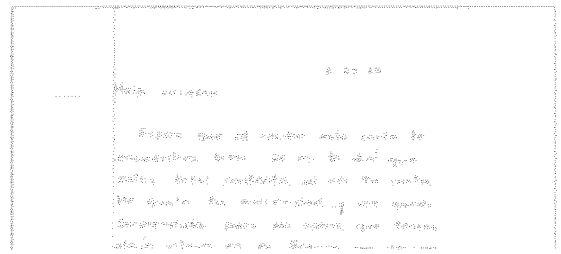 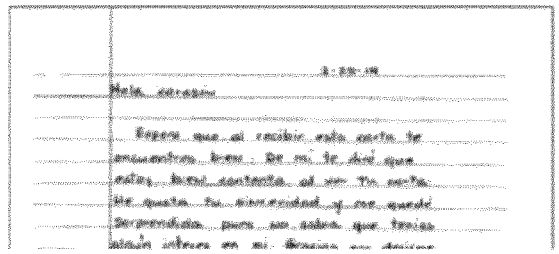
FIG. 6A  FIG. 6B
Letter on colored pages (BEFORE)  Letter on colored pages (AFTER)
FIG. 6C  FIG. 6D
 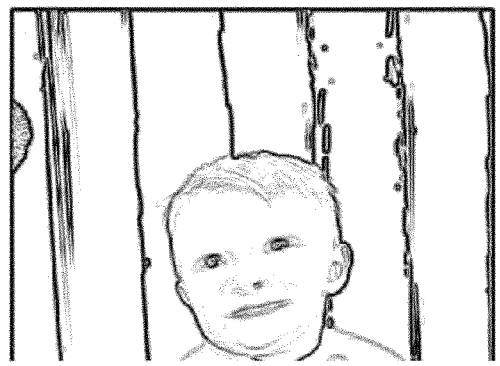
FIG. 6E  FIG. 6F

Mail Content Rejection Form

Please provide a reason and a brief description as to why content(s) of this mail is being rejected so that the SENDER and the INMATE could be notified accordingly.

Select A Reason ⌄    (* required)

Provide brief description (Oprional)

REASONS LIST INCLUDES:

1) Inmate is not in custody at this facility
2) Unacceptable text language
3) Unacceptable photo(s)
4) Mail for this inmate is not accepted
5) Mail from this sender is not accepted

| Cancel | Accept | Reject |

Accepting mail will simply reverse original decision to reject mail.

FIG. 7

MULTI-MEDIA COMMUNICATION SYSTEM FOR INCARCERATED PERSONS

CROSS-REFERENCE TO RELATED APPLICATION(S)

The present application derives priority from U.S. Provisional Patent Application 62/874,202 filed 15 Jul. 2019.

BACKGROUND OF THE INVENTION

1. Field of the Invention

The present invention relates generally to computer processes and, in particular, a computer process for screening and distribution of multi-media correspondence to incarcerated individuals.

2. Description of the Background

Incarcerated men and women who maintain contact with supportive family members are more likely to succeed after their release. Shanahan and Agudelo, "*The Family and Recidivism*", American Jails, p17 (September/October 2012). Family members of incarcerated inmates in county, state and federal correctional facilities are permitted to correspond by mail or by telephone, and in some cases by private electronic messaging services. In no case is this a straightforward process. Prisons typically rely on different third party providers for each type of correspondence media.

For example, many prisons rely on third party mail processors to screen physical mail. For every piece of postal mail received at the facility, processor staff must look up the inmate, determine whether the inmate is allowed to receive any mail, determine whether the inmate is allowed to receive mail from that particular sender, sort the mail for delivery based on inmate housing assignments, and then screen the mail for sexually explicit language or other unlawful content. Screening rules vary from state to state and institution to institution, and this can frustrate family members who send numerous photos only to have them all screened due to one that is borderline. On the other hand, screening staff can make errors in judgment. In addition, in many state prison systems inmates are transferred frequently and families are not always notified of transfers until long after the move. Nevertheless, the mail delivery process is a daily activity, and it demands substantial processor resources to accomplish the task.

Similarly, many prisons have telephone contracts with carriers requiring long distance collect calls from prisoners which place the cost on family members, resulting in large monthly long distance bills.

Digital correspondence is now being permitted in some correctional facilities. There are several variants on this process. In some locations, inmates have access to computers and can send and receive text messages in a manner similar to traditional email. In other locations, messages are reviewed and printed for hardcopy distribution. Inmates may be allowed to respond to the inbound messages by submitting a hardcopy message that is scanned and transmitted to an outside recipient.

For example, U.S. Pat. No. 9,311,627 to Shipman, Jr. et al. issued Apr. 12, 2016 shows a mail processing and delivery system for use within a controlled-environment facility that converts hard copy mail to digital mail items, compares the sender/addressee to an electronic database to determine whether the inmate is allowed to receive the physical mail or not, and whether an electronic message service is available to the inmate. Based on the result the digital format mail item is either delivered electronically, printed for distribution, or not delivered.

Similarly, United States Patent Application 20160337360 by Logan shows a correctional postal mail contraband elimination system that converts inmate postal mail to an electronic format, abstracts out information about the sender, recipient, mail contents, and institution into a format that is easily reviewable, associates the scanned mail with inmate email accounts, tags it with an access flag that denies access to said inmate, and provides tracking data. The scanned mail may then be made available to the intended inmate and institution staff. Institution staff may also then access the associated information and tracking data.

Some private prison phone companies such as Securus Technologies and Global TelLink offer single-purpose messaging and video communication, but they are expensive single-purpose services and do not benefit from the efficiency of a comprehensive cross-platform solution. None of the existing third party solutions balance the conflicting goals of the correctional facility versus inmates and their families.

All the foregoing systems offer partial solutions based on some level of automation. What is needed is a secure system and computer-implemented method that enables families and friends to communicate with incarcerated loved ones more conveniently and affordably, that allows family and friends to receive inmate hand-written reply letters digitally on their smartphone or by email at no extra cost, and which adds the cross-platform capabilities of sending text messages with photos, greeting cards and custom drawings online.

SUMMARY OF THE INVENTION

An object of the present invention is to provide an innovative system, method and computer program product for managing cross-platform communications between families and friends with incarcerated loved ones more securely, conveniently and affordably, and with full audit trail for accountability.

According to embodiments of the invention, the system includes a plurality of computers or portable devices such as "smart phones", tablets and/or kiosks used by each party including family and friends, a correctional facility, facility staff and/or inmates, and a facilitating Application Service provider (ASP) providing Software as a Service (SaaS) via one or more back-end application servers configured with ASP software, all connected via a communications network. The ASP provides a dashboard to each party including a family/friends dashboard facilitates composition and sending, an administrative dashboard that facilitates initial ASP processing, a scanning dashboard that facilitates remote screening, a correctional staff dashboard that facilitates pre-screening and delivery, and an inmate dashboard that facilitates receipt and reply. Each party's dashboard is configured to execute computer-readable program code to update a transaction record associated with each mail piece, the transaction record comprising an audit trail indicating one or more actions taken by each user.

The various participant dashboards update a transaction record and provide a collaboration platform by which the ASP can automate key facets of the process, the correctional facility staff and/or inmates can fulfill their duties, and families, friends and incarcerated loved ones can communicate more quickly, efficiently and inexpensively.

The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

FIG. 6A is an image of a scanned greyscale text mail piece prior to processing by the legibility module for visual analysis.

FIG. 6B is an image of the processed mail piece of FIG. 6A.

FIG. 6C is an image of a scanned text mail piece on colored paper prior to processing by the legibility module for visual analysis.

FIG. 6D is an image of the processed mail piece of FIG. 6A.

FIG. 6E is an image of a scanned photo mail piece prior to processing by the legibility module for visual analysis.

FIG. 6F is an image of the processed mail piece of FIG. 6E.

FIG. 7 is a screen print of the Mail Content Rejection Form.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

Figure 1:
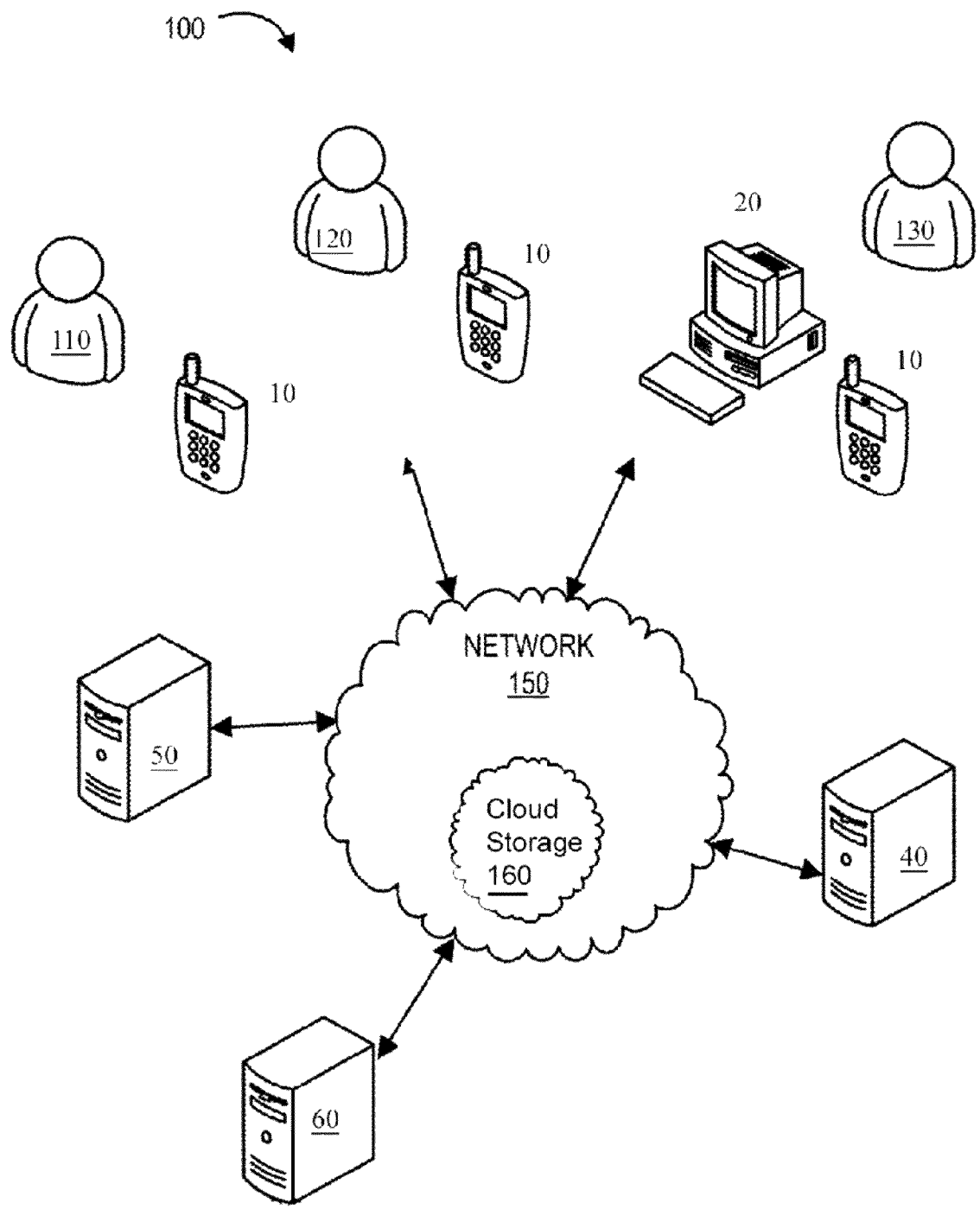
FIG. 1 is a block diagram illustrating a distributed network system and architecture suitable for implementing the curated communication system for multi-media communication with incarcerated persons, in accordance with embodiments of the invention.

As illustrated in FIG. 1, system 100 participants include an incarcerated inmate 110 and one or more family members or friends 120 desiring to correspond, as well as correctional facility staff 130. Inmate 110, family/friend(s) 120 and facility staff 130 may each access the system 100 via a mobile device 10 and/or a personal computing device 20.

The mobile devices 10 and the personal computing devices 20 are configured to communicate over a network 150 with a correctional facility server 40, and a back-end application service provider (ASP) system 50. The ASP 50 provides Software as a Service (SaaS) via communications network 150. ASP system 50 is configured to communicate over network 150 with a remote screening station 60. As seen in FIG. 1 a cloud-based repository 160 is part of the network 150. Cloud-based repository 160 provides a virtual storage solution between ASP 50 and remote screening station 60 as will be described.

As used herein, a "mobile device" 10 is any smart mobile communication device capable of executing third party software, such as a cellular telecommunications device (i.e., a cell phone or mobile phone), personal digital assistant (PDA), a mobile Internet accessing device, or other mobile device.

The personal computing device 20 may be any conventional personal computer that employs a processor and memory and can perform computing and data communication functions, such as a personal computer, tablet or other known device.

A "computing device" may be any personal computing device 20 or mobile device 10.

The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network.

The mobile devices 10 and personal computing devices 20 are configured with application software providing a user-interface dashboard specific to each party, including a general inmate dashboard, family/friend dashboard, facility staff dashboard and ASP dashboard. Similarly, the mobile devices 10 are configured with application software providing a dashboard specific to each party. The respective dashboards facilitate curated communication as will be described. The dashboards for mobile devices 10 may be mobile applications, and for computers 20 may be implemented as standalone software programs, or a server-side program resident on ASP server 50 with a thin-client front end on computers 20.

All the dashboards for mobile devices 10 and computers 20 intercommunicate via network 150 and thereby provide a collaboration platform. The cloud-based repository 160 provides an economical virtual storage solution between ASP 50 and remote screening station 60 as described below.

Each user has is assigned login credentials by ASP 50 and in order to access the respective user account(s) must authenticate with the ASP 50. For example, logging in generally requires that the user 110-130 authenticate his/her identity using a user name, a passcode, a cookie, a biometric identifier, a private key, a token, and/or another authentication mechanism that is provided by the user 110-130 via their mobile device 10 or computer 20.

Figure 2B:
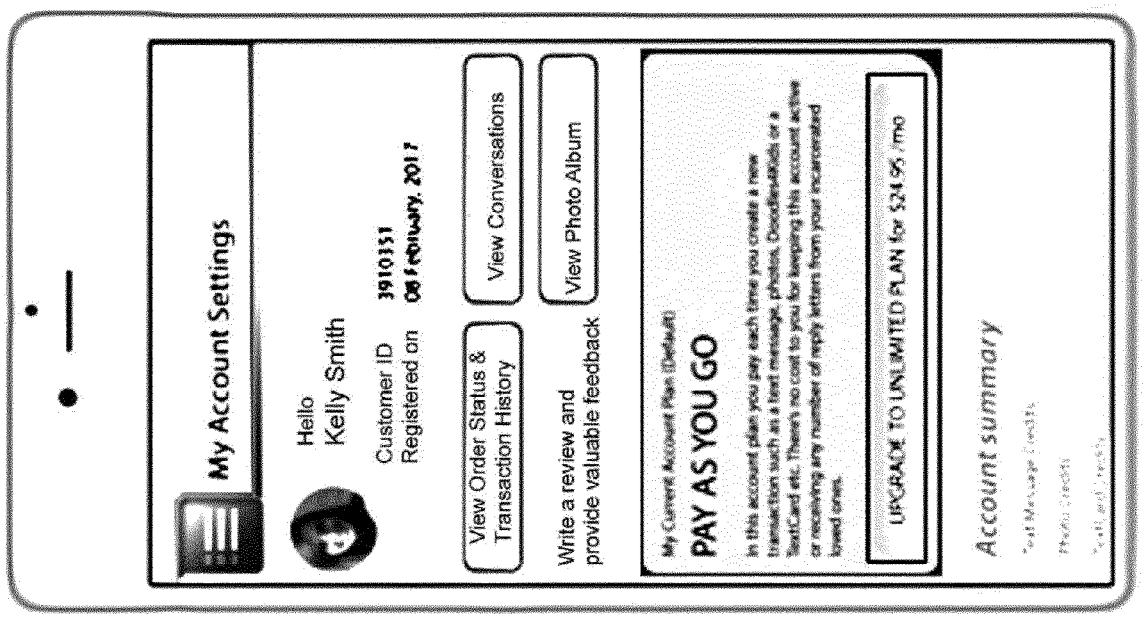
FIG. 2B is the My Account Settings page.
Figure 2A:
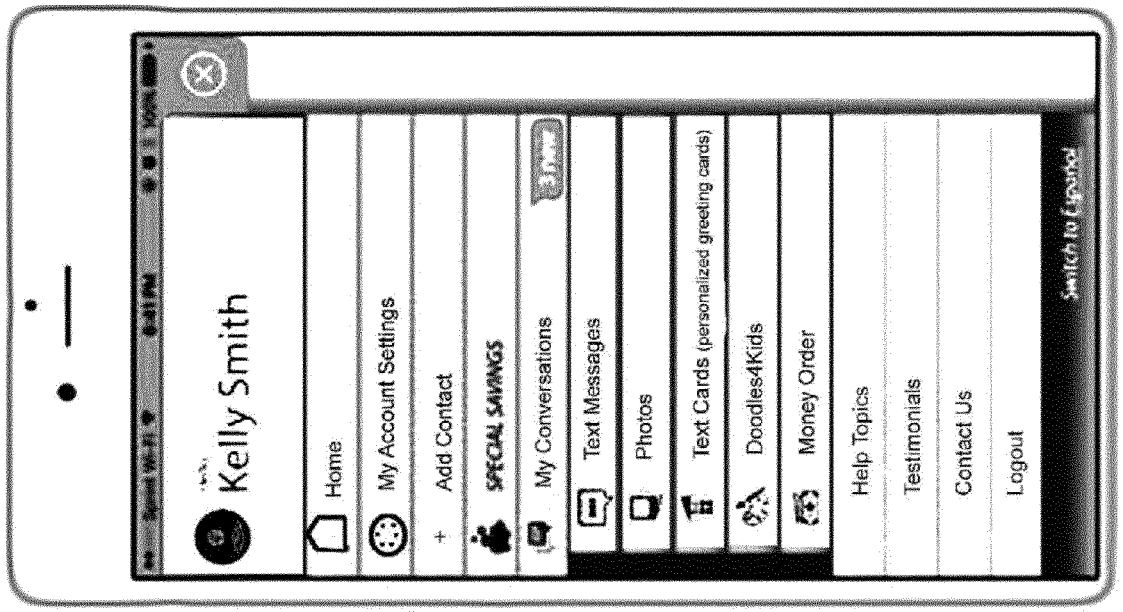
FIG. 2A is screen print of the family/friend dashboard.

FIG. 2A is screen print of the family/friend dashboard that includes several sequential screens for implementing the present workflow to facilitate communication. The family/friends dashboard includes several selectable topics including: Home; My Account Settings; Add Contact; My Conversations; Help Topics; Testimonials; Contact US, and Logout. Selection of any topic breaks out a drop-down list of sub-topics. Thus, selection of Home returns to the splash screen.

Family and friends must pre-register with ASP 50 and enter contact information. Information collected at this point includes contact info (addresses, emails, phones, etc.), and billing information. For security, all device IP addresses are also recorded for an additional layer of verification. After data entry, mobile devices 10 are connected by SMS Verification: an automated text is be sent to the user's phone. The text contains a one-time code that they will input on their profile to verify that they own their phone number.

FIG. 2B is the My Account Settings page. Given pre-registration above, selection of My Account Settings allows review and editing of user account settings in a known manner. Selection of Add Contact allows the user to search for and locate their incarcerated loved one and add them as a contact. Selection of Help Topics yields a help index. Selection of Testimonials Contact US, and Logout are self-explanatory. Selection of My Conversations drops down a listing of available communication modes including Text Messages; Photos; TextCards®; Doodles4xKids®; and Money Order. Selection of Text Messages facilitates a text dialogue with an inmate. Selection of Photos facilitates sending photos. Selection of TextCards® facilitates sending an electronic greeting card from pre-existing templates. Selection of Doodles4Kids® facilitates children composing and sending digital pictures. Selection of Money Order facilitates sending a money order. Of course, the most basic form of inmate communication is by postal mail, and the user need not employ the family/friend dashboard for that. They simply write a letter to their incarcerated loved one at the facility.

In accordance with the present invention, incoming postal mail is directed to a centralized receiving center by correctional facility postal regulations and/or is redirected by conventional mail forwarding techniques to the centralized receiving center. In practice, multiple correctional facilities will forward mail to a one centralized receiving center. That mail is then forwarded to ASP 50, or alternatively ASP 50 may serve as the centralized receiving center.

Figure 3:
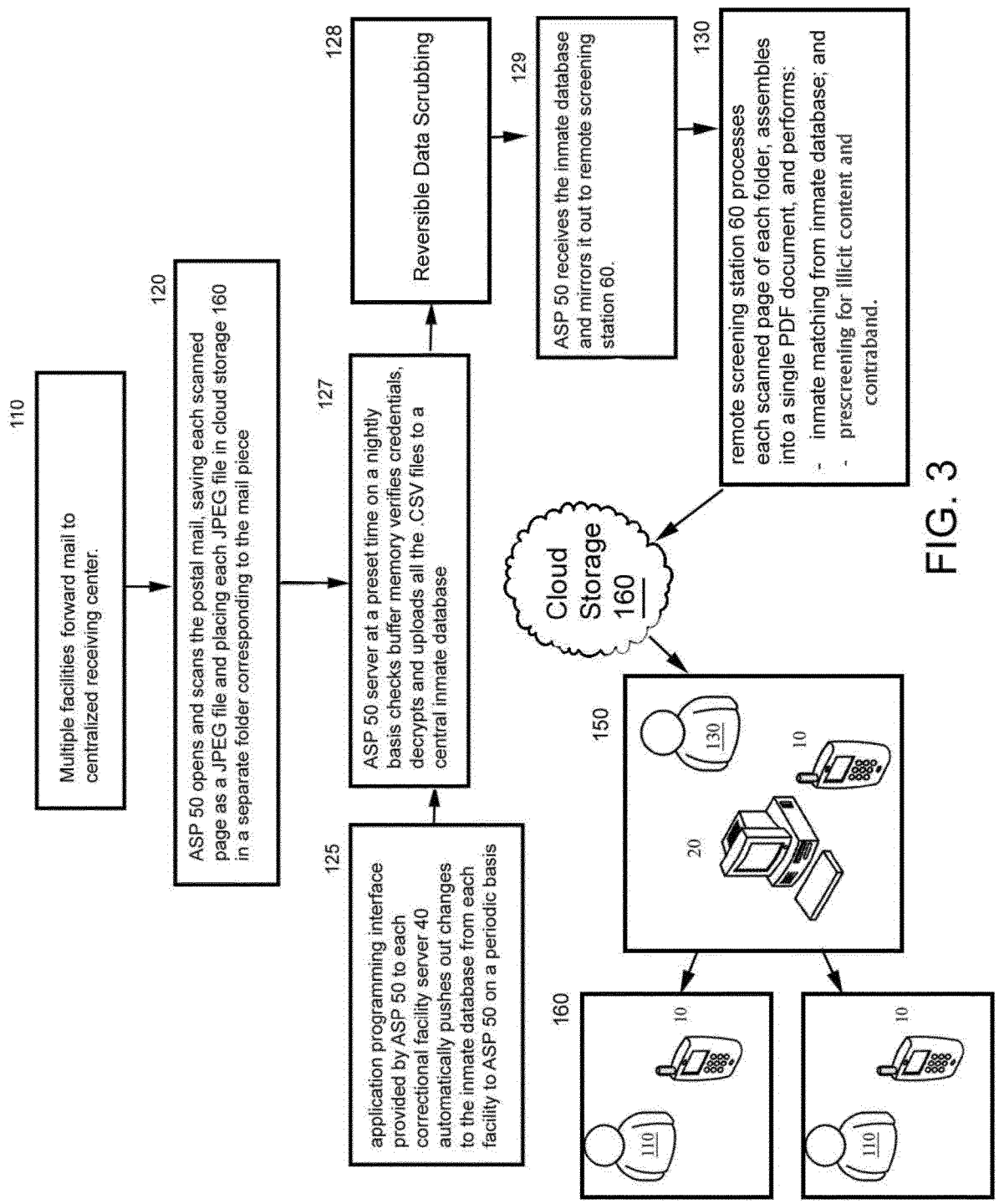
FIG. 3 is a sequential block diagram of the curated communication system for multi-media communication with incarcerated persons, in accordance with embodiments of the invention.

FIG. 3 is a sequential block diagram of the present process. Per correctional facility postal regulations all inmate mail is typically shipped to a central address for each of multiple correctional facilities.

At step 110, those multiple correctional facilities will forward mail to ASP 50 which serves as a centralized receiving center.

At step 120, ASP 50 opens and scans the postal mail, saving each scanned page as a JPEG file and placing each JPEG file in cloud storage 160 in a separate folder. The ASP 50 checks the inmate's "ACTIVE" status (verifying against inmate database if inmate is still at the facility, as described in step 125 below).

At step 125 each participating correctional facility with relevant inmate postal information periodically transmits changed inmate post information from its correctional facility server 40 to ASP 50. This is accomplished by an application programming interface provided by ASP 50 to each correctional facility server 40 that automatically pushes out changes to the inmate database from each facility to ASP 50 on a periodic (e.g., daily) basis. In an embodiment, the changes to the inmate database from each facility to ASP 50 are pushed out at a preset time on a nightly basis (e.g., 12 a.m.) as a .CSV file by a secure encrypted protocol which ASP 50 stores in buffer memory. The CSV file includes variable combinations of the following information:
Inmate unique ID (record ID aka ConID)
Inmate first name, middle name, last name
Inmate DOC ID
Inmate SID, if applicable
Housing information to be divided as: (provide info where applicable, else, leave blank.
Building #
Block #
Section/Pod #
Bed #
Project ID (for DOC clients)
Site ID (facility)

At step 127 the ASP 50 server at a preset time on a nightly basis (e.g., 1 a.m.) checks buffer memory for the new file, verifies credentials, decrypts and uploads all the .CSV files to a central inmate database.

At step 128 the ASP 50 initiates a Merge/Unmerge software module that links new records to the existing database. As indicated above, in many prison systems inmates are transferred frequently and prisoner records sent from one facility will be duplicates of those sent from another, or not fully match. For example, typically when an inmate is booked into a correctional facility they are assigned a temporary ID. The temporary ID is later replaced with a permanent ID, but sometimes the inmate is released before this happens and a permanent ID is never assigned. Sometimes they are readmitted and given a second temporary ID. Sometimes inmates have multiple permanent IDs. Sometimes records associated with the multiple IDs do not exactly match. In sum, there can be a large amount of duplicitous and/or contradictory data. Conventional practice in this situation is to employ data scrubbing to ensure data integrity. During scrubbing dupes are eliminated and the integrity of the inmate data is checked. However, in practice data scrubbing on large volume constantly-changing databases takes excessive computer overhead, and the end result is irreversible. The present system's Merge/Unmerge module solves both problems by matching newly received inmate records to existing records and linking new records to existing records in a master database. This effectively results in a linked tree of related records including suspected duplicates, beginning with an original new inmate record (associated with a temporary ID, a linked permanent ID if assigned, and perhaps multiple other records all linked together as they are received). When a new record is received the Merge/Unmerge module compares the new data to the existing database using known deduplication ruleset. If the comparison finds that the newly received inmate record is a duplicate of a pre-existing record it does not delete it, but simply links it to the parent record using known relational database field convention (rows in a table linked to rows in other tables by added column containing a linking key as known in the art). This approach effectively creates an indelible inmate master database of all received inmate records with suspected duplicates and errors linked to parent records but not deleted. Duplicate records are never deleted, but simply ignored on the basis of links. The entire process is completely reversible, and a complete audit trail exists illustrating what records were received, when, and how they were linked and flagged.

At step 129, as soon as the ASP 50 has imported and linked the new data in the existing master database the entire master database is automatically mirrored out to the remote screening station 60.

At step 130, remote screening station 60 employs their remote screening dashboard to process each scanned JPEG page of each folder, assemble the JPEGs into a single correspondence item PDF document, and preprocess the correspondence item PDF in a semi-automated manner. This includes several semi-automated substeps as follows:
inmate matching from inmate database; and
prescreening for illicit content and contraband.

These prescreening substeps are accomplished by remote screening station 60 sequentially invoking automated software modules as follows.

First, a matching software module is invoked and performs an automated matching process comparing the buffered information to the master database. The abstracted sender information is compared to registered subscriber records to determine the sender's subscriber record, and recipient inmate details are compared to the master database to determine the recipient inmate record. If the inmate details are correlated to a single inmate the abstract is updated with any additional details from the database and importantly the abstract is populated with the full internal postal address, which typically entails appending Building number and ward or block number to the abstract. The resulting abstract file includes the following information:

Subscriber/sender ID
Subscriber/sender first name, middle name, last name
Subscriber/sender address
Inmate unique ID (record ID aka ConID)
Inmate first name, middle name, last name
Inmate DOC ID
Inmate SID, if applicable
Housing information to be divided as: (provide info where applicable, else, leave blank.
  Building #
  Block #
  Section/Pod #
  Bed #
  Project ID (for DOC clients)
  Site ID (facility)

The entire abstract file is then appended to the correspondence item PDF file as a metadata abstract.

Finally, the remote screening station 60 may optionally prescreen each PDF for inappropriate content. The bulk of screening is necessarily completed by correctional facility staff or their contractors. However, initial prescreening can be accomplished more efficiently in a semi-automated manner by staff manning the remote screening station 60 dashboard. This is accomplished by a file viewer at the remote screening station 60 dashboard that provides redaction and incremental hold tools. The remote screening station 60 staff may also use its dashboard to manually prescreen each PDF for inappropriate content, including text and images. For example, occurrences of the word "gun" may be highlighted. Explicit photos may be flagged. The remote screening station 60 dashboard is similar to the correctional facility dashboard in this regard which is described below in detail.

At step 140, the remote screening station 60 deposits each prescreened PDF mail piece back into the cloud storage 160 in a separate folder designated by a uniform inmate address (UTA) consisting of two letter state abbreviation, four digit correctional facility number, seven digit building number, and seven digit cell number.

At step 150, correctional facility staff 130 invoke their dashboard on computer 20 or mobile device 10 which runs a short embeddable script that fetches a listing of URLs each referring to a daily mail piece processed and stored on cloud storage 60. The correctional facility dashboard provides an index-tab selection appearing across the top, inclusive of a mail Sorter Production Panel, Return to Sender Panel; Mail Review and Unified PDF Print Panel (Screen-N-Clean); an Inmate Record Merger/Unmerger Panel, and an Auto-Content Discovery (Smart Search) Panel. The panels are used sequentially to expedite mail production from the pre-production PDF pre-screened by remote scanning facility 60 to a post-production distribution-ready correspondence item.

Figure 4:
FIG. 4 is a screen print of the correctional facility dashboard: Production Panel

FIG. 4 is a screen print of the correctional facility dashboard Production Panel A filter selection appears across the top of the screen allowing the user to filter the listing of available pre-production PDFs by any of state, correctional facility, correspondence type (text, photos, letter, greeting card, doodle or money order), or by the abstracted metadata including inmate name, building #, block #, section/pod #, and site ID (facility). The listing of filtered results appears below and any one or more correspondence items can be checked. This filter capability is important because it allows the corrections staff to process messages in batches that are defined by the manner in which the correspondence will be delivered. Thus, for example, if is responsible for delivering all of building #10 correspondence to a kiosk located therein he/she can filter the relevant mail accordingly. Similarly, if a user is responsible for delivering correspondence via tablet to be shared only between inmates in block#22 he/she can filter only the relevant correspondence accordingly. The filtered or unfiltered listing is shown at left named by state, site ID, inmate number, item number and page number.

Each filter window of the Production Panel provides a lookup function. For example, predictive forward and reverse customer look up by name, phone, customer ID and email. Upon selection, connected inmates are displayed instantly to choose from. Similarly, the Production Panels provides a predictive forward and reverse inmate look up by name and inmate ID. Upon selection, connected family and friends are displayed instantly to choose from. This includes TextBehind registered customers as well as those who have ever sent handwritten letters in the past since it is a self-enhancing (dynamic relational database) architecture. It does not matter whether the sender or recipient inmate is selected first, the system is bi-directional.

Figure 5:
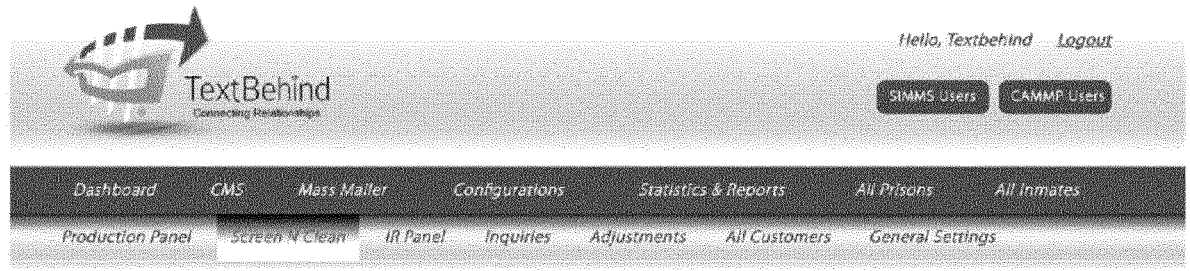
FIG. 5 is a screen print of the correctional facility dashboard: Screen-N-Clean Panel.

From the filtered pre-production correspondence item listing shown below the staff can select one or more documents and initiate their download from cloud storage. The batch download occurs transparently in the background and staff can continue production as this occurs. This increases throughout from a few hundred to a few thousand mail objects FIG. 5 is a screen print of the correctional facility dashboard: Screen-and-Clean panel, which is instantiated by clicking on the Screen-N-Clean menu index item. The user can click a listed correspondence item, view the creation date, initiate database searches for the sender (customer) and/or inmate as above, and if necessary add/delete/modify customers and/or inmates. Given a selected correspondence item the user can upload the different parts of the correspondence item for screening: envelopes, text pages, photos, and PDFs. The user can then click to upload individual parts of the selected correspondence item (envelopes, photos, text, and PDF letters) from cloud storage 60. The Screen-and-Clean panel is arrayed with two columns including Colored Images (left) and Greyscale images (right). Each column includes a plurality of correspondence type headers: colored images includes envelopes, text pages, photos, PDFs, while Grayscale includes only text and envelopes. Beneath each correspondence type header is a drag and drop target that initiates uploading and immediate viewing of the correspondence item for manual screening. Importantly, when any selected part of a correspondence item is uploaded for processing it is automatically subjected to a Legibility Module, a software script that employs a rule-based image processing algorithm to improve legibility to a distribution-ready state. This is important because many family and friends when writing letters use colored envelopes, multi-colored pens, markers and even extremely low legibility ink colors such as gold, yellow and fluorescent inks. Normally this would entail manual processing of each scanned page of each folder plus several time-consuming graphic modification functions to try to make all letters readable. This requires extra effort and resources while providing no quantifiable benefit to the inmates. As a solution the present system automatically segregates photographic objects (left column) from non-photographic objects (right column), processes all non-photographic objects in dynamic high-contrast grayscale mode to increase writing contrast for optimum legibility, and leaves all photographic objects such as colored drawings, colored photograph and greeting cards in full color. The segregation and legibility improvement of the Legibility Module entails a rule-based analysis that distinguishes envelopes from photos from text, background coloration, and text coloration. Any text is converted to greyscale and contrast is increased to remove background behind text, thereby providing a dynamic high-contrast grayscale mode to increase writing contrast for optimum legibility. Cleaning and improving contrast is accomplished by an automated image script that converts the RGB greyscale image to greyscale, and then adjusts colors, white balance, gamma correction and overall light correction.

FIGS. 6A-6F illustrate side-by-side visual comparisons of various mail contents before and after processing by the legibility module for visual analysis. At FIG. 6A a letter was written in light blue ink and when scanned appears faint, but after processing yields the image of FIG. 6B. At FIG. 6C a letter was written on yellow lined paper and when scanned appears blurry, but after processing yields the image of FIG. 6D. At FIG. 6E a photo is stored as a RGB JPEG and is not processed as seen in FIG. 6F. However, the legibility module will automatically crop extra space outside the photo content and auto-straighten image using edge detection algorithm. The script will also assemble up to 4 photos on a single sheet of paper after sequencing by image file name.

After legibility improvement all selected/uploaded parts of a correspondence item are auto-sequenced and assembled into a single multi-page PDF file, preserving the original color profile. If there is more than 1 envelop image with a mix of colored and B&W profiles, the system will subsequence (multi-pass) images based on original file names while assembling final letter PDF.

The selected parts are displayed in a file viewer along with an array of screening tools, and the staff can use the dashboard to manually prescreen each PDF for inappropriate content, including text and images. This is shown to the lower right of FIG. 5 where four photos have been uploaded.

Correctional facility mail managers need the ability to not only reject an entire letter based on its contents and/or other reasons, they should also be able to reject a single item such as text or a photograph from the letter. The correctional facility dashboard provides screening tools including accept, reject, redaction and incremental hold tools for any individual part or parts of the correspondence (similar to the remote screening station 60 dashboard noted above). The uploaded parts of the selected correspondence can then be screened as indicated in FIG. 5, one photo checked as accepted and three rejected. Portions can be redacted and/or blacked out as needed. More globally, the user can pre BLOCK/UNBLOCK the entire communication between two contacts if they deem necessary. Anytime that a correspondence item or portion thereof is rejected a Mail Content Rejection Form pops up as shown in FIG. 7. This compels the correctional facility staff to indicate why. A drop-down list of pre-approved reasons is provided including: inmate not in custody at this facility; unacceptable language; unacceptable photos; mail for this inmate not accepted; and mail from this sender not accepted. The list of selections helps to reduce subjectivity in the rejection process. The staff makes a selection and provides a brief description. Upon clicking "Submit" a file assembly software module assembles all accepted/screened text (contacts profiles and filenames), bitmap images and appendable PDFs and puts them into multi-thread array in the background, thus eliminating wait time. Again, the background uploading is designed to increase uploading efficiency by at least 150-200%. All processes specified above will actually create a single PDF correspondence item containing one letter in the background, e.g., the Master PDF. The Master PDF is saved back to cloud storage 60.

However, anytime that any portion of a correspondence item is rejected a RTS (Return to Sender) protocol must be followed and this can be time and labor intensive. The present system relieves the correctional facility of the burden by informing the inmate as well the sender about the mail content rejection. The system replaces any rejected object with a notation including the Mail Manager's basis for rejection and optional short text description for the rejection. The rejection data is printed on the letter exactly where the original (rejected) content would have been, providing precise information to the sender as well as that inmate as to which aspect of their letter was rejected and why. When the correspondence item is delivered to the inmate as per below (electronically or in print) the rejection data appears in place of the original (rejected) content. In addition, the ASP 50 performs the necessary RTS return notification process to the sender. If the original mail was created electronically by the sender all original content with specific mail content rejection data will be displayed in the family/friends dashboard, and they are sent an email notification about rejected mail content data. If the letter was written by hand, the ASP 50 returns the original physical (rejected) letters to respective senders along with an image of the envelope and screened correspondence item including the reasons for the mail rejection.

At step 160 distribution of correspondence to inmates may be by an inmate device, be it a tablet, kiosk, or printer for hard copy delivery. Generally, if the inmate profile at ASP 50 exists, the inmate mail will be delivered electronically via tablet/kiosk only. Otherwise, it will be added to a print queue for physical delivery. Inmates would only know that they have mail by logging into a tablet/kiosk. Consequently, the correctional facility dashboard upon "Submit" also sends an automated IVR notice to the inmate's phone number.

For tablet/kiosk delivery the ASP 50 creates a script for each device and distributes the scripts each to the appropriate device. When initiated this script will FETCH a mail button linking to an inmate dashboard by which the inmate can perform various functions.

If the invitee is a customer already, they'll receive text, email and a prompt in their account to accept connection invite from the inmate. Upon acceptance, all pertinent messages will show up as conversations (FIG. 2). If the invitee is not a customer, they will receive invite text and email to join with all necessary details. The inmate and family member may then:

View Messages (only messages prescreened);

Reply or Create A New Message (the inmate can reply to any message by adding text if applicable).

No matter what form of correspondence all above-described dashboards capture their entire transaction log and compile an audit trail of redactions, deletions, distribution, etc., and transmit the audit log to ASP 50 for later inspection.

When needed this protects or implicates the correctional facility staff against claims of selective treatment. The audit trails are transmitted back to ASP 50, consolidated and used to calculate metrics for viewing by the correctional facilities. Each audit trail comprises a record of action taken (in reversible format), date, and associated USER. For each action, the system also provides a URL link to the screen where each change was made and its result. The audit logs are consolidated by ASP 50 by associating each audit log with the associated USER, ordering by Date, and sequencing by actions taken.

Figure 8:
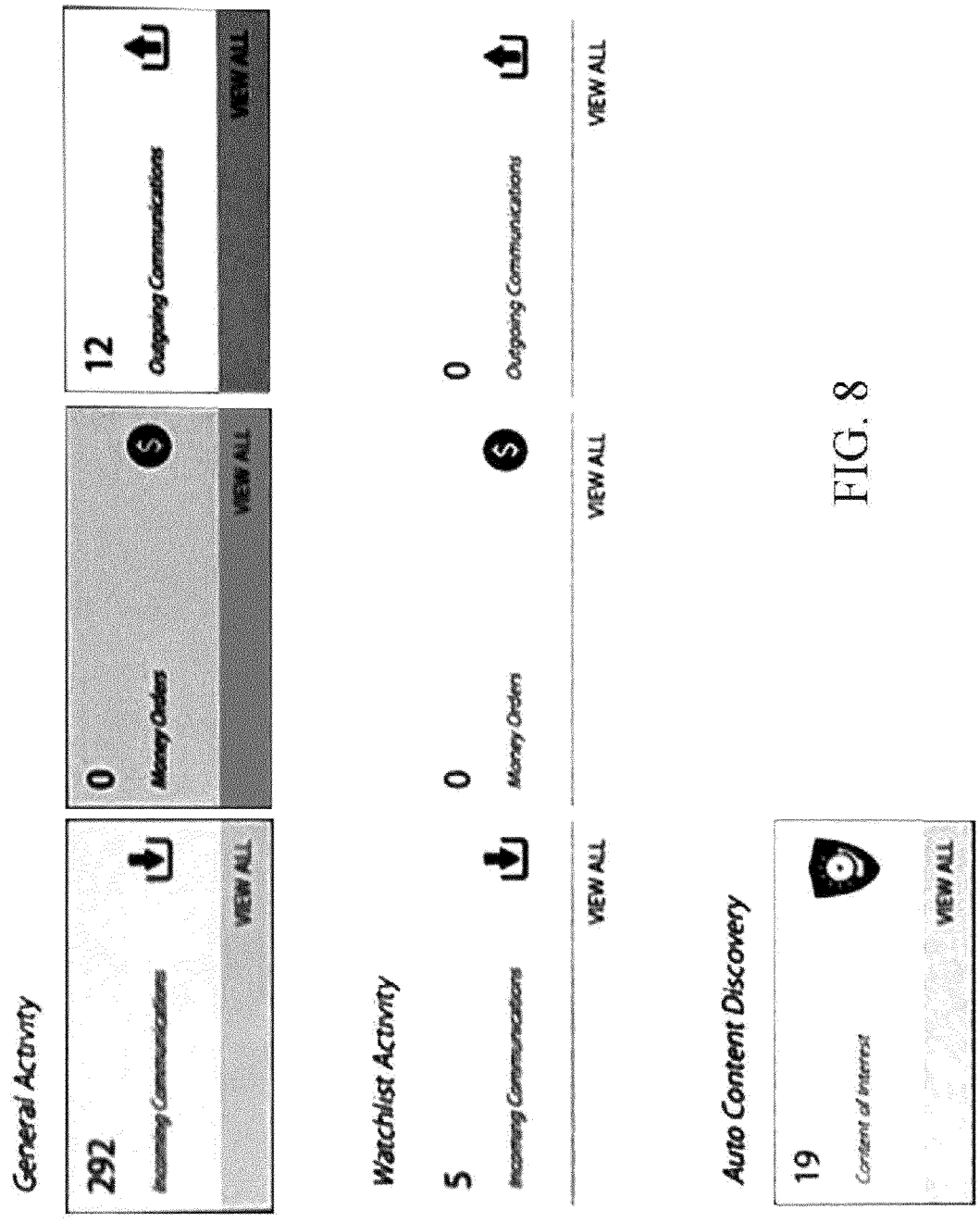
FIG. 8 is a screen print of the metrics display by which the correctional facility can monitor incoming mail.

FIG. 8 is a screen print of the metrics display by which the correctional facility can monitor incoming mail (# of messages and replies received), watch list activity, and the like. All historical records will still be maintained on the ASP 50 server for investigative and archival purposes, e.g., for up to 7 years.

It should now be apparent that the above-described system, method and computer program product manages cross-platform communications between families and friends with incarcerated loved ones more securely, conveniently and affordably, and with full audit trail for accountability.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A system for managing communications between an incarcerated person and subscriber desiring to correspond, comprising:

a server network hosted by an application service provider (ASP) comprising at least one server computer and a secure database management system including a master database containing an inmate record of inmate identification data and inmate location data, and a subscriber record of subscriber identification data and subscriber location data, and a plurality of client applications running locally on remote client computing devices and configured to communicate with said ASP server network, said client applications at least including, a data export application in communication with the correctional facility server and said ASP server network, and comprising software instructions configured to periodically export changed inmate identification data and changed inmate location data to the ASP server network from said correctional facility server, an ASP application running on said ASP server network and comprising software instructions configured to maintain a master database of inmate identification data and inmate location data and subscriber identification data and subscriber location data, to compare said changed inmate location data and said changed inmate identification data exported from said correctional facility server to said master database and identify duplicate data, and to add data exported from said correctional facility server to said master database with a link correlating duplicate data, a remote prescreening application running on a remote client computing device and comprising software instructions configured to display a communication between an incarcerated person and subscriber comprising a digital scan of a physical mail piece stored on a cloud server as a plurality of scanned JPEG pages, and designate portions thereof as approved, rejected or redacted, an inmate client application configured to run on a correctional facility computing device and comprising software providing an inmate interface for displaying approved portions of said communication without displaying rejected or redacted portions.

2. The system of claim 1, further comprising a correctional facility client application comprising software instructions configured to display said communication between an incarcerated inmate and non-incarcerated subscriber and to allow correctional facility staff to review and edit designations made by said remote pre-screening application.

3. The system of claim 1, wherein said data export application comprises an application programming interface configured to automatically export said changes to the ASP application on a periodic basis.

4. The system of claim 3, wherein said periodic basis comprises every night.

5. The system of claim 1, wherein said ASP application comprises software instructions configured to detect erroneous inmate identification data and inmate location data.

6. The system of claim 1, wherein said ASP application timestamps data inputted from said data export application.

7. The system of claim 1, wherein said ASP application updates said master database based on time-stamped duplicate data from data inputted from said data export application.

8. The system of claim 1, wherein said ASP application does not delete duplicate data.

9. The system of claim 4, wherein said ASP application automatically mirrors the master database to the remote pre-screening computing device on said periodic basis.

10. The system of claim 2, wherein said communication comprises one of a digital scan of a physical mail piece and an electronic communication.

11. The system of claim 1, wherein said remote prescreening application is configured to download and combine said plurality of scanned JPEG pages into a single document.

12. The system of claim 11, wherein said remote pre-screening application is configured to fetch a listing of URLs from said ASP server each pointing to one of said plurality of scanned JPEG pages stored on said cloud server.

13. The system of claim 11, wherein said remote pre-screening application comprises a legibility enhancing image processing script that automatically segregates photographic objects from non-photographic objects.

14. The system of claim 13, wherein said legibility image processing script automatically converts text to grayscale without converting photographic objects from color.

15. The system of claim 13, wherein said legibility image processing script automatically adjusts contrast.

16. The system of 12, wherein each of said client applications capture a transaction and mail review audit log and transmit the audit log to the ASP server.

17. The system of claim 1, wherein the ASP server application comprises software instructions configured to allow drag-and-drop uploading of a plurality of scanned JPEG pages to the said correctional facility client application for reviewing.

18. The system of claim 12, wherein said ASP application comprises software instructions configured to automatically pre-sort approved communications according to inmate housing information.

19. The system of claim 11, wherein said ASP application comprises software instructions configured to automatically and dynamically generate notification events and data to alert the original senders of communications if their communication was reviewed, redacted, partial rejected or rejected completely.

20. In a data processing system managed by an application service provider (ASP) that hosts at least one application server and at least one secure database management system connected via a communications network to at least one correctional facility, a method of screening communications between an inmate in said correctional facility and their family of friends, comprising the steps of:
maintaining a master database at said at least one secure database management system containing inmate data and subscriber data;
periodically exporting new inmate data from said at least one correctional facility to said secure database management system, matching said new inmate data to existing data in said master database,
adding said new inmate data to said master database and linking it to matched existing inmate data;
forwarding mail from said ASP to said correctional facility;
scanning said mail to a plurality of scanned JPEG pages;
uploading said plurality of scanned JPEG pages to cloud storage;
preprocessing said scanned mail;
providing a correctional facility staff dashboard to allow acceptance, dynamic redaction or rejection of said preprocessed scanned mail;
assembling said accepted scanned mail into a single master correspondence file for distribution to the recipient;
notifying both sender and recipient of rejected scanned mail.

21. The method of screening communications according to claim 16, wherein said step of matching new inmate data to existing data in said master database comprises detecting duplicate data.

22. The method of screening communications according to claim 16, wherein said step of scanning said mail comprises scanning a plurality of JPEG pages of said mail, combining said plurality of JPEG pages of said mail to a single document, and uploading said single document to cloud storage.

23. The method of screening communications according to claim 18, wherein said step of preprocessing said scanned mail comprises clicking a URL pointer to said cloud storage to initiate downloading of said single document and designating all or a portion of said document inappropriate.

24. The method of screening communications according to claim 19, wherein said step of providing a correctional facility staff dashboard allows acceptance or rejection of designations during said preprocessing step.

* * * * *